UNITED STATES PATENT OFFICE.

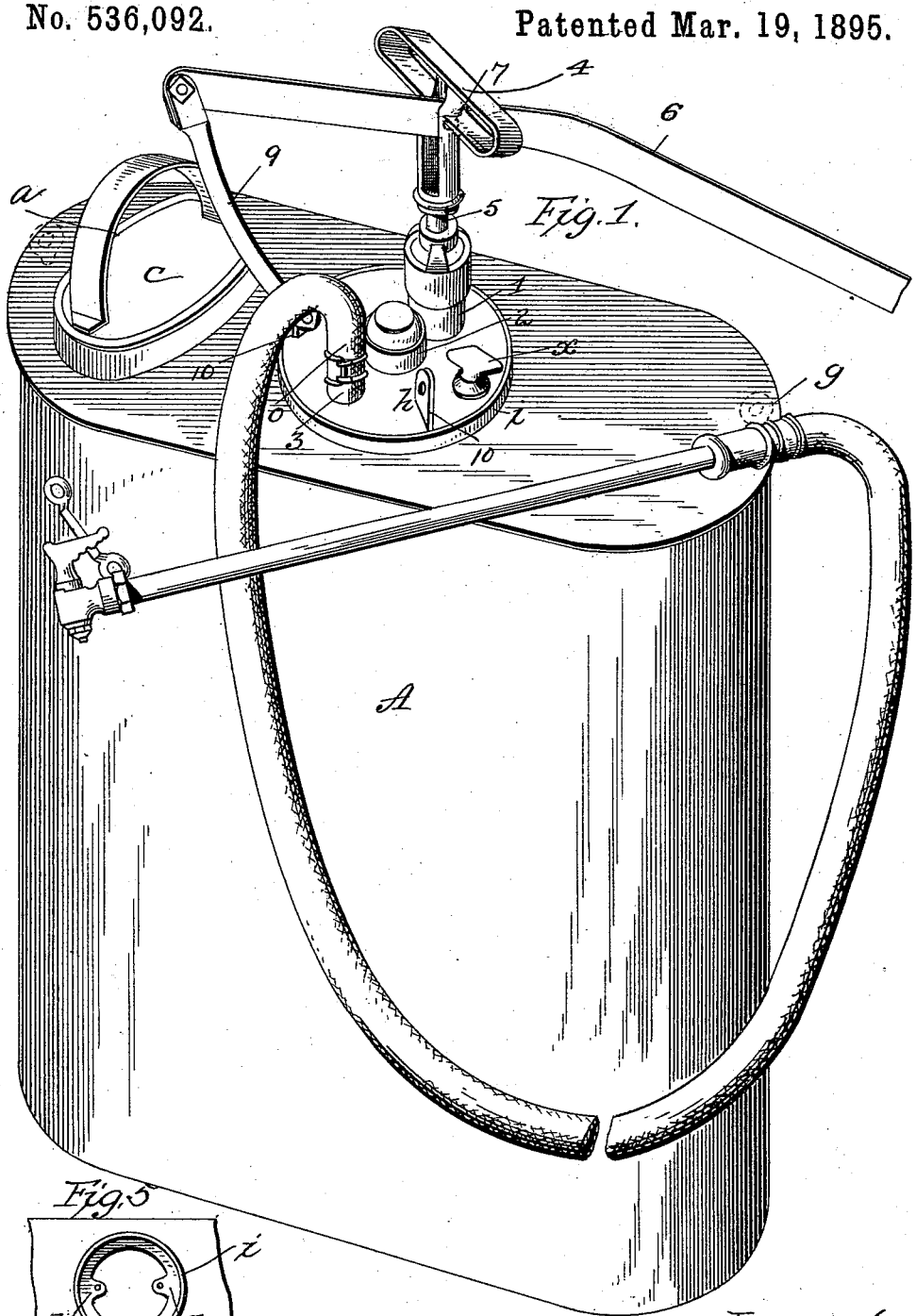

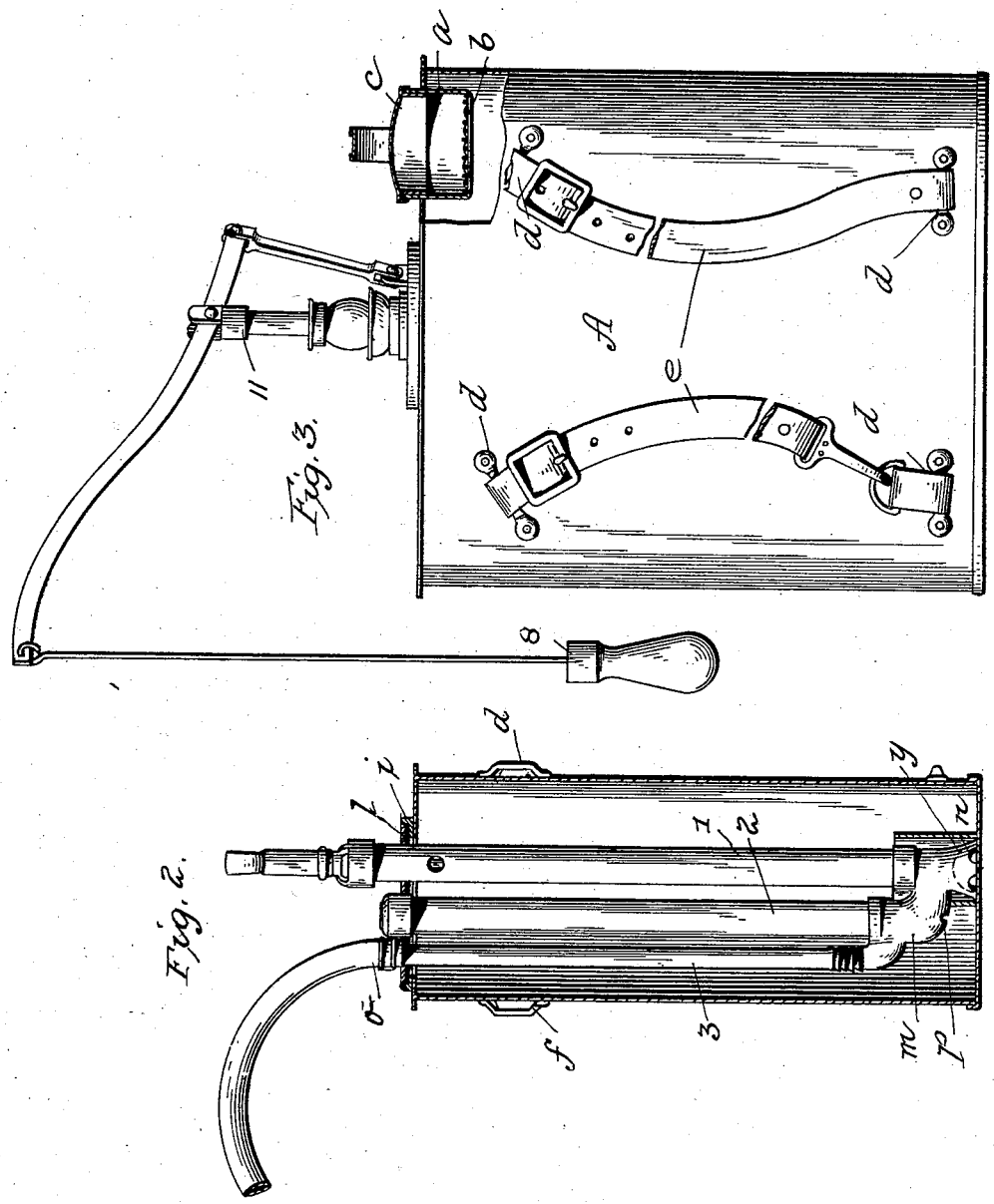

PHILIP A. MYERS, OF ASHLAND, OHIO.

SPRAYING APPARATUS.

SPECIFICATION forming part of Letters Patent No. 536,092, dated March 19, 1895.

Application filed September 8, 1894. Serial No. 522,518. (No model.)

*To all whom it may concern:*

Be it known that I, PHILIP A. MYERS, a citizen of the United States of America, residing at Ashland, in the county of Ashland and State of Ohio, have invented certain new and useful Improvements in Spraying Apparatus, of which the following is a specification.

My invention is an improved spraying apparatus, being designed for use in spraying trees and small bushes, although it is not limited in this respect, and may be used for a lawn, yard, garden, green-house, washing windows, and may also be used for white-washing.

The invention consists principally of a pump to be used in connection with a tank or other receptacle and adapted to discharge an agitating stream into the tank or receptacle to agitate the contents thereof.

In the accompanying drawings—Figure 1 is a perspective view of the tank ready for use. Fig. 2 is a sectional view through the tank and pump. Fig. 3 shows a modification of the lever support. Figs. 4 and 5 are views of details.

In the drawings the tank is represented at A, and is preferably of galvanized iron and of a size suited to the purposes for which it is intended. It is provided with an inlet $a$ protected by a bottom of gauze $b$, so that in pouring in the liquid it is strained and all foreign matter which would interfere with the action of the pump is prevented from entering the tank. A cover $c$ closes this opening. This tank is provided with lugs $d$ in four places on the rear side adapted to receive the straps $e$ and these straps may be placed over the shoulders after the manner of a knapsack, in case the tank is required to be carried in this way. A like lug $f$ is arranged upon the front side at the upper end of the tank, and one of the straps may have its end hooked into this lug so as to make it convenient to be carried; or as shown by dotted lines in Fig. 1, ordinary lugs $g$ may be provided on the upper side at each end to receive the hooked ends of a bail by which the tank may be carried conveniently from one point to another.

The spraying device is readily removable from the tank for the purpose of cleaning, or for the purpose of being used independently of the tank where circumstances may require such independent use, and in this case an attachment may be connected to it as will be more fully hereinafter explained, in order that the pump may be supported upon a bucket or like receptacle.

The tank is provided with an opening at its upper end in which the spray pump is inserted, and to the upper end of the pump is secured a disk $h$ adapted to fit within a rim plate $i$, secured around the opening in the tank. This plate has projecting lugs $k$ screw threaded and the disk of the spray pump has openings corresponding with these threaded holes so that, when the pump is in place threaded bolts may be passed through the holes in the disk and into the threaded lugs to secure the pump rigidly to the tank. A rubber gasket $l$ is inserted between the disk and the rim plate.

The spray pump proper consists of three tubes joined at their lower ends to a single casting of step form as indicated at $m$. The first tube 1, constitutes the pump barrel and is provided with a bucket of ordinary form for lifting the water. This tube is threaded into the casting in direct line with an opening which extends through the casting, and over the lower end of this opening is a piece of wire gauze $y$ to prevent the pump from drawing up anything which would interfere with its proper working. The open end of the casting is flaring and is provided with notches in the edge as shown at $n$, so that when the open end rests directly upon the bottom of the receptacle the fluid may be readily drawn in by the action of the pump. A second tube of the same diameter as the first, indicated at 2, is screwed into the second step of the casting and this tube is closed at its upper end and forms an air chamber in which the column of air is first compressed by the water and afterward reacts upon it to make the discharge continuous. To the third step of the casting the discharge pipe 3 is fitted and this may be as shown, a metal tube of small diameter or a rubber hose may be directly connected to the nipple of the third step of the casting. In the present case in the specific use of the pump shown, I prefer to make this a metal tube extending to the disk and connect the rubber hose with the end of this tube as shown at $o$. The disk is connected to the air pipe by solder or otherwise and all three of the tubes extend above the surface of this disk.

In order to prevent any annoyance from the pump overflowing I provide the pump barrel with two openings just below the disk near the upper end of the barrel and any water that gets above the pump bucket will flow out of these holes and back into the tank.

In the bottom of the second step of the casting I form a perforation or opening at the point $p$ for the purpose of agitating the contents of the tank or other receptacle. When a mixture is used in spraying where there is a sediment, or where it is desirable to keep the mixture constantly agitated, I have found that this simple opening is the most effective kind of an agitator, as by the action of the pump a small stream of the mixture is forced out through this opening into the bottom of the receptacle and this has the effect of keeping the contents of the tank constantly stirred up.

To the end of the hose, which may be of any length, I secure a tube and to the end of this tube I fit a nozzle which may be any of the well known forms, adapted either to discharge a direct stream or to spray the mixture as may be found desirable or necessary.

I may operate the pump by the ordinary handle 4, secured to the piston rod 5 of the pump when the tank is upon a level, or within the reach of the hand; but when the tank is elevated as for instance upon the back and used in the form of a knapsack, I provide a lever 6 which is pivoted at 7, in a slot in the handle, which lever terminates at one end in a handle, and being supported at its other end through a link 9, pivoted to a lug 10 on the disk of the pump. Two of these lugs 10 are provided on the disk so that the operating handle may be shifted from one side to the other.

Where it is desirable to make the tank and pump for use only as a knapsack sprayer, I may, as shown in Fig. 3, provide the piston rod with an upright post 11, instead of the handle shown in the other figures, and support upon this post the pivoted rod with a downwardly depending handle 8 for operating the same.

When the pump is detached from the tank and used as a bucket sprayer I attach to the pump barrel a clamp 12, provided with a set screw which is adapted to screw the pump to the edge of the bucket or other receptacle, and in this position the pump may be operated in the usual manner.

I do not limit myself to the particular construction of pump, as I may place the discharge pipe within the air pipe in a well known manner as this would give the same result. This arrangement is so well known that it is not thought necessary to illustrate it.

Having thus described my invention, what I claim is—

1. A spray pump consisting of a pump barrel and piston, an air pipe, a discharge pipe and a casting having an inlet opening and a perforation for the discharge of an agitating stream, substantially as described.

2. A spray pump consisting of a pump barrel, a piston, an air pipe, a main discharge pipe and a supplemental discharge, for an agitating stream, substantially as described.

In testimony whereof I affix my signature in presence of two witnesses.

PHILIP A. MYERS.

Witnesses:
PAUL BEER,
R. M. TUBBS.